US009483849B2

(12) United States Patent
Choi et al.

(10) Patent No.: US 9,483,849 B2
(45) Date of Patent: Nov. 1, 2016

(54) METHOD AND APPARATUS FOR CONTROLLING CAMERA FOR COLOR CALIBRATION OF MULTI-DISPLAYS

(71) Applicant: SAMSUNG ELECTRONICS CO., LTD., Suwon-si (KR)

(72) Inventors: Hye-rin Choi, Suwon-si (KR); Nam-kyun Beon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 14/341,006

(22) Filed: Jul. 25, 2014

(65) Prior Publication Data

US 2015/0138221 A1 May 21, 2015

(30) Foreign Application Priority Data

Nov. 18, 2013 (KR) ........................ 10-2013-0139712

(51) Int. Cl.

*G06T 11/00* (2006.01)
*G06F 3/14* (2006.01)
*G06Q 30/02* (2012.01)
*H04N 17/04* (2006.01)
*H04N 9/73* (2006.01)
*G01J 3/50* (2006.01)
*H04N 5/235* (2006.01)
*H04N 5/238* (2006.01)
*H04N 5/243* (2006.01)

(52) U.S. Cl.

CPC .............. *G06T 11/001* (2013.01); *G01J 3/506* (2013.01); *G06F 3/1446* (2013.01); *G06Q 30/0276* (2013.01); *H04N 5/2351* (2013.01); *H04N 9/735* (2013.01); *H04N 17/04* (2013.01); *G09G 2320/0233* (2013.01); *G09G 2320/0693* (2013.01); *G09G 2360/145* (2013.01); *H04N 5/238* (2013.01); *H04N 5/2353* (2013.01); *H04N 5/243* (2013.01)

(58) Field of Classification Search

CPC .................... G06T 7/0018; G09G 2320/0686; G09G 2320/0693

See application file for complete search history.

(56) References Cited

U.S. PATENT DOCUMENTS

2004/0212691 A1* 10/2004 Sato ....................... H04N 9/735 348/223.1
2009/0027523 A1* 1/2009 Chang .................. H04N 9/3147 348/254
2012/0127324 A1 5/2012 Dickins et al.

FOREIGN PATENT DOCUMENTS

JP 2012-88551 A 5/2012

* cited by examiner

*Primary Examiner* — Antonio A Caschera
(74) *Attorney, Agent, or Firm* — Sughrue Mion, PLLC

(57) ABSTRACT

A method for controlling a camera for color calibration of multi-displays including: acquiring a first image of data displayed on the multi-displays by photographing the multi-displays with the camera; analyzing color of the data displayed on at least one individual display from among the multi-displays using the acquired first image; determining image capture settings suitable for the color calibration of the multi-displays, based on a result of the analyzing; adjusting the image capture settings of the camera in accordance with the determined image capture settings; acquiring a second image of the data displayed on the multi-displays by photographing the multi-displays with the camera using the adjusted image capture settings of the camera; and performing color calibration of the multi-displays based on the second image.

18 Claims, 6 Drawing Sheets

10
200
100
110
IMAGE ACQUIRER
120
DATA ANALYSIS PROCESSOR
130
140
CAMERA SETTING ADJUSTER
WHITE BALANCE SETTING ADJUSTER
EXPOSURE SETTING ADJUSTER
150
170
COLOR CALIBRATION PROCESSOR
CAMERA SETTING CONTROLLER
160

10
100
110
IMAGE ACQUIRER
120
DATA ANALYSIS PROCESSOR
130
CAMERA SETTING ADJUSTER
140
WHITE BALANCE SETTING ADJUSTER
150
EXPOSURE SETTING ADJUSTER
160
CAMERA SETTING CONTROLLER
170
COLOR CALIBRATION PROCESSOR
200

CAMERA SETTING CONTROLLER
160
IMAGE ACQUIRER
110
DATA ANALYSIS PROCESSOR
120
EXPOSURE SETTING ADJUSTER
150
INDIVIDUAL-DISPLAY EXPOSURE DETERMINER
152
ALL-DISPLAY EXPOSURE DETERMINER
154
OPTIMAL EXPOSURE-SETTING CALCULATOR
155
EXPOSURE SETTING INFORMATION MODIFIER
158
IMPOSSIBLE-CALIBRATION MESSAGE DISPLAY
156

FIG. 6

| R LEVEL | G LEVEL | B LEVEL | EXPOSURE DETER-MINATION | R LEVEL | G LEVEL | B LEVEL | EXPOSURE DETER-MINATION | R LEVEL | G LEVEL | B LEVEL | EXPOSURE DETER-MINATION |
|---|---|---|---|---|---|---|---|---|---|---|---|
| L | L | L | EXPOSURE↑ | - | L | L | EXPOSURE↑ | H | L | L | IMPOSSIBLE ADJUSTMENT |
| L | L | - | EXPOSURE↑ | - | L | - | EXPOSURE↑ | H | L | - | IMPOSSIBLE ADJUSTMENT |
| L | L | H | IMPOSSIBLE ADJUSTMENT | - | L | H | IMPOSSIBLE ADJUSTMENT | H | L | H | IMPOSSIBLE ADJUSTMENT |
| L | - | L | EXPOSURE↑ | - | - | L | EXPOSURE↑ | H | - | L | IMPOSSIBLE ADJUSTMENT |
| L | - | - | EXPOSURE↑ | - | - | - | SUITABLE EXPOSURE | H | - | - | EXPOSURE↓ |
| L | - | H | IMPOSSIBLE ADJUSTMENT | - | - | H | EXPOSURE↓ | H | - | H | EXPOSURE↓ |
| L | H | L | IMPOSSIBLE ADJUSTMENT | - | H | L | IMPOSSIBLE ADJUSTMENT | H | H | L | IMPOSSIBLE ADJUSTMENT |
| L | H | - | IMPOSSIBLE ADJUSTMENT | - | H | - | EXPOSURE↓ | H | H | - | EXPOSURE↓ |
| L | H | H | IMPOSSIBLE ADJUSTMENT | - | H | H | EXPOSURE↓ | H | H | H | EXPOSURE↓ |

METHOD AND APPARATUS FOR CONTROLLING CAMERA FOR COLOR CALIBRATION OF MULTI-DISPLAYS

CROSS-REFERENCE TO RELATED APPLICATION

This application claims priority from Korean Patent Application No. 10-2013-0139712, filed on Nov. 18, 2013, in the Korean Intellectual Property Office, the disclosure of which is incorporated herein by reference in its entirety.

BACKGROUND

1. Field

Apparatuses and methods consistent with the exemplary embodiments relate to a method and apparatus for optimizing a camera for color calibration of multi-displays, and more particularly to a method and apparatus for optimizing a camera, in which optimized settings for a white balance and exposure suitable for color calibration of multi-displays are automatically determined so a user can easily perform the color calibration.

2. Description of the Related Art

With an increase in demand for display-based advertisement, multi-displays have been configured as a video wall, in which multiple displays are connected together to form a single, large screen. In this case, a fabrication error, variation in display characteristics as on the display ages, etc. cause difference in color among the displays. To solve this problem, color calibration among the displays is necessary.

A conventional calibration method employs a spectrophotometer that can measure the tristimulus values (XYZ) of light. In this conventional method, the spectrophotometer has to contact the display, and it is thus difficult to approach the display if the display is installed at a location that is not easily accessible. Also, in the conventional method, the color calibration is performed for every individual display, and therefore calibration time increases.

Meanwhile, calibration may be performed using a camera instead of using the spectrophotometer. If the camera is used, calibration is convenient because multiple displays are photographed at a single time.

FIG. 1 is a block diagram showing a conventional color calibration apparatus 30 using a digital still camera (DSC) 32 for calibrating multi-displays 10 which displays the image from the image displaying device 20.

The conventional color calibration apparatus 30 includes a color calibration image display 31, which displays an image for calibrating on the plurality of displays; an image acquisition processor 33, which photographs a color calibration image and acquires a photographed image; an image adjustment processor 34, which performs an image adjustment process with regard to the photographed image; a target chromaticity calculation processor 35, which calculates target chromaticity from the photographed image after the image adjustment process; a color calibration coefficient calculation processor 36, which calculates a color calibration coefficient; and a color calibration processor 37, which applies the calculated color calibration coefficient to the display.

Such a conventional color calibration apparatus 30 of the multi-displays 10 employs a raw image to adjust a white balance in the image adjustment processor 34 and adjust exposure settings in accordance with the purpose of the multi-display. If there is no guide to camera settings and a user is not very knowledgeable about the color calibration, it is difficult for the user to determine the proper camera settings. Although the raw image is advantageous to exclude effects of data processing (e.g., white balance adjustment, etc.) in a digital camera, a decoding process of an input data is needed because encoding formats are different among manufacturers. Further, the data size of raw image is large.

SUMMARY

Aspects of one or more exemplary embodiments may provide a method and apparatus for controlling a camera for color calibration of multi-displays, in which optimized settings for a white balance and exposure suitable for color calibration of multi-displays are automatically determined so that a user, who may not be very knowledgeable about the color calibration, can easily perform the color calibration.

Aspects of exemplary embodiments may also provide a method and apparatus for controlling a camera for color calibration of multi-displays, in which measured data about an individual display and all the displays is analyzed and synthetically determined, thereby performing white balance and exposure settings of the camera.

According to an aspect of another exemplary embodiment, there is provided a method of controlling a camera for color calibration of multi-displays, the method including: acquiring a first image of data displayed on the multi-displays by photographing the multi-displays with the camera; analyzing color data of the data displayed on at least one individual display from among the multi-displays using the acquired first image; determining image capture settings of the camera suitable for the color calibration of the multi-displays, based on a result of the analyzing; adjusting the image capture settings of the camera in accordance with the determined image capture settings; acquiring a second image of the data displayed on the multi-displays by photographing the multi-displays with the camera using the adjusted image capture settings of the camera; and performing color calibration of the multi-displays based on the second image.

The data displayed on the multi-displays may include a color calibration pattern.

The color calibration pattern may include a mono color image having full white gradation or full gray gradation.

The image capture settings of the camera may include white balance settings, and the determining may include calculating a white balance error with respect to red (R): green (G):blue (B)=1:1:1 in the data display in the at least one individual display, based on the result from analyzing.

The determining may include calculating an average error of the multi-displays, based on the white balance error of the at least one individual display.

The determining may include calculating an average error of the multi-displays with respect to the white balance of the camera, and selecting the white balance settings minimizing the average error.

The adjusting may include adjusting the image capture settings of the camera according to the selected white balance settings having the minimum average error.

The image capture settings of the camera may include exposure settings, and the determining may include measuring each level of R, G, and B data of the at least one individual display, determining whether the measured levels of R, G, and B data are within a predetermined reference range, and determining whether to adjust the exposure based on a result of the determining.

The determining may include generating a message that exposure adjustment is impossible, in response to the result of the determining indicating that there is an individual display of which the levels of R, G, and B data are higher than the predetermined reference range and lower than the predetermined reference range.

The determining may include determining that the exposure of the camera should be adjusting in response to the result of the determining indicating that each of the levels of R, G, and B data of the at least one individual display are within and higher than the predetermined reference range, within and lower than the predetermined reference range, all higher than the predetermined reference range, and all lower than the predetermined reference range.

The determining the camera settings may include generating a message that exposure adjustment is impossible, in response to the result of the determining indicating that the levels of R, G, and B data of a first individual display among the at least one individual display are higher than the predetermined reference range and the levels of R, G, and B data of a second individual display of the at least one individual display are lower than the reference range.

The adjusting may include adjusting the exposure settings of the camera to minimize the difference of the levels of the R, G, and B data of the at least one individual display.

The exposure settings may include at least one among shutter speed, aperture setting and international standard organization (ISO) speed.

According to an aspect of another exemplary embodiment, there is provided an apparatus for controlling a camera for color calibration of multi-displays, the apparatus including: an image acquirer configured to acquire a first image of data displayed on the multi-displays with the camera; a data analysis processor configured to analyze color data of the data displayed on at least one individual display among the multi displays using the acquired first image; an image capture setting determiner configured to determine image capture settings suitable for the color calibration of the multi-displays, based on a result of the analyzing; an image capture setting controller configured to control the image capture settings to be adjusted in accordance with the determined image capture settings, the image acquirer may be further configured to acquire a second image of the data displayed on the multi-displays with the camera after the camera setting controller controls the image capture settings of the camera; and a color calibration processor configured to perform color calibration of the multi-displays based on the acquired second image.

The image displayed on the multi-displays may include a color calibration pattern.

The color calibration pattern may include a mono color image having full white gradation or full gray gradation.

The image capture setting adjuster may include a white balance setting adjuster, and the white balance setting adjuster may calculate a white balance error with respect to red (R):green (G):blue (B)=1:1:1 in the data displayed on the at least one individual display, based on the result of the analyzing.

The white balance setting adjuster may calculate an average error of the multi-displays, based on the white balance error of the at least one individual display.

The white balance setting adjuster may calculate an average error of the multi-displays with respect to the white balance of the camera, and select the white balance settings minimizing the average error.

The image capture setting controller may control the camera to have the selected white balance settings having the minimum average error.

The image capture setting determiner may include an exposure setting adjuster, and the exposure setting adjuster may measure each level of R, G, and B data of the at least one individual display, determine whether the measured levels of R, G, and B data are within a predetermined reference range, and determine whether to adjust the exposure based on a result of the determining.

The exposure setting adjuster may generate a message that exposure adjustment is impossible, in response to the result of the determining indicating that there is an individual display of which the levels of R, G, and B data are higher than the predetermined reference range and lower than the predetermined reference range.

The exposure setting determiner may determine that the exposure of the camera should be adjusted in response to the result of the determining indicating that each of the levels of R, G, and B data of the at least one individual display are within and higher than the reference range, within and lower than the reference range, all higher than the reference range, and all lower than the reference range.

The exposure setting determiner may generate a message that exposure adjustment is impossible, in response to the result of the determining indicating that the levels of R, G, and B data of a first individual display among the at least one individual display are higher than the predetermined reference range and the levels of R, G, and B data of a second individual display among the at least one individual display are lower than the predetermined reference range.

The image capture setting controller may control the exposure settings of the camera with the selected exposure settings to be adjusted to minimize the difference of the levels of the R, G, and B data of the at least one individual display.

The exposure settings may include at least one among shutter speed, aperture setting and international standard organization (ISO) speed.

According to an aspect of another exemplary embodiment, there is provided a method of color calibration of a multi-display, the method including: capturing a first image with a camera of first image data displayed on the multi-display, and wherein the captured first image comprises at least one sub-image corresponding to at least one individual display among the multi-display; analyzing color data of sub-image data of the at least one captured sub-image; determining camera settings suitable for the color calibration of the multi-display, based on a result of the analyzing; adjusting image capture settings of the camera in accordance with the determined camera settings; capturing a second image of second image data displayed on the multi-display with the camera using the adjusted image capture settings of the camera; and performing color calibration of the multi-display based on the captured second image.

The first image data and the second image data may be the same data.

The first image data and the second image data may be different data.

The at least one sub-image may include a sub-image corresponding to each individual display among the multi-display, and the analyzing may include analyzing color data of each sub-image.

BRIEF DESCRIPTION OF THE DRAWINGS

The above and/or other aspects will become apparent and more readily appreciated from the following description of exemplary embodiments, taken in conjunction with the accompanying drawings, in which:

FIG. 6 is a chart for explaining a reference for determining an exposure degree of the individual display by the exposure setting adjuster.

DETAILED DESCRIPTION

Below, exemplary embodiments will be described in detail with reference to accompanying drawings. The matters defined in the description are provided to assist in a comprehensive understanding of one or more exemplary embodiments. However, it is apparent that exemplary embodiments can be carried out without those specifically defined matters. Also, functions or elements known in the related art are not described in detail because they would obscure the exemplary embodiments with unnecessary detail. Further, like numerals refer to like elements throughout.

Multi-displays 10 including many displays may have differences in color reproduction among the displays because of a fabrication error, variation in display characteristics as on the display ages, etc. A color calibration apparatus 100 receives from a camera 200 a photographed image a pattern of the multi-displays 10, optimally adjusts settings of the camera 200, and adjusts color among the multi-displays 10 based on the image acquired by the camera 200 having the optimized settings.

The color calibration apparatus 100 may include a processor, may be incorporated into a personal computer, a notebook computer, a server, etc., and a program (software) based on an algorithm for analyzing and processing acquired image data and finding optimal camera settings.

The camera 200 may include a digital camera, a film camera, a camcorder, or the like as long as white balance settings, exposure settings, and international standard organization (ISO) settings are adjustable therein.

Figure 1:
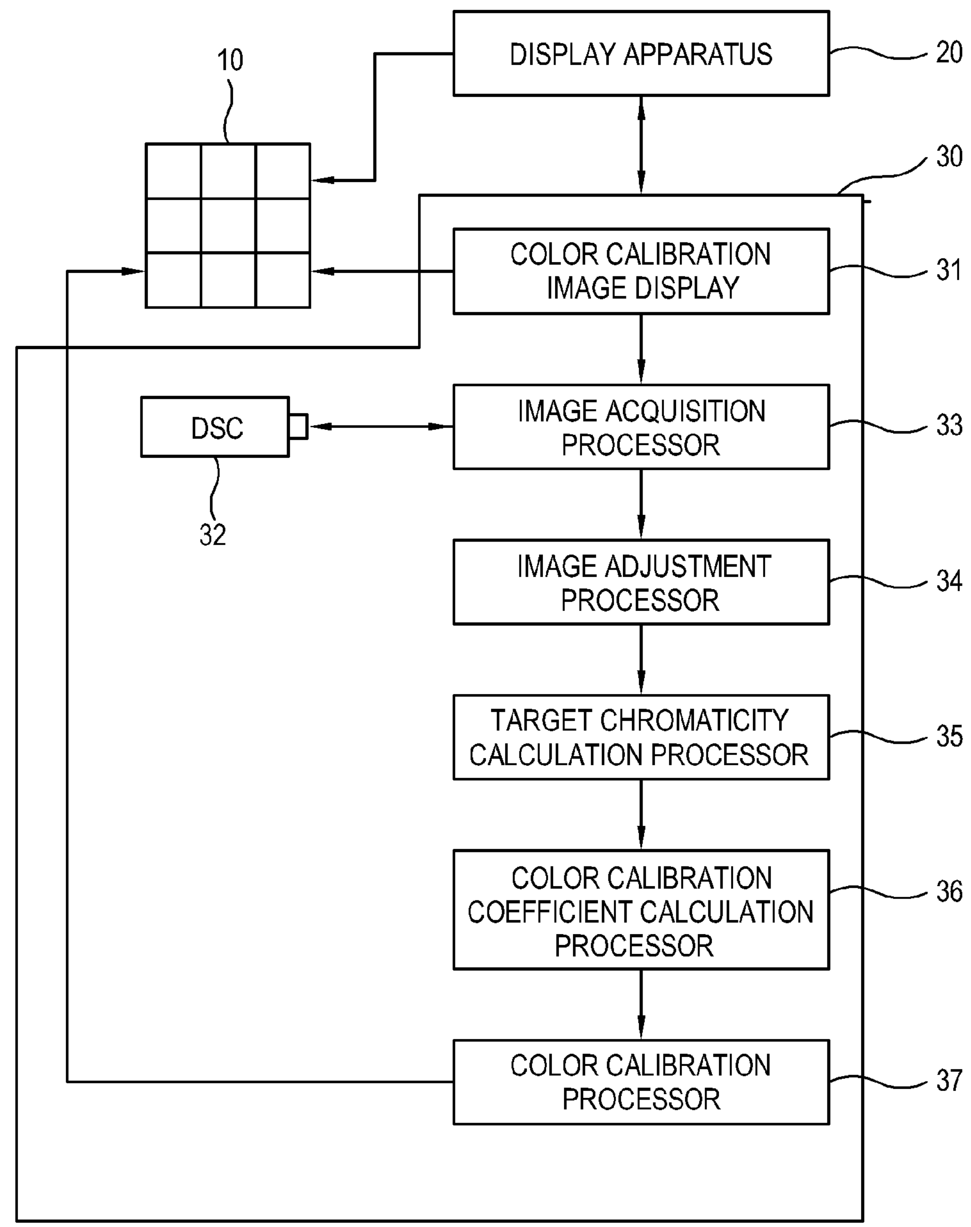
FIG. 1 is a block diagram showing a conventional color calibration apparatus using a camera.
Figure 2:
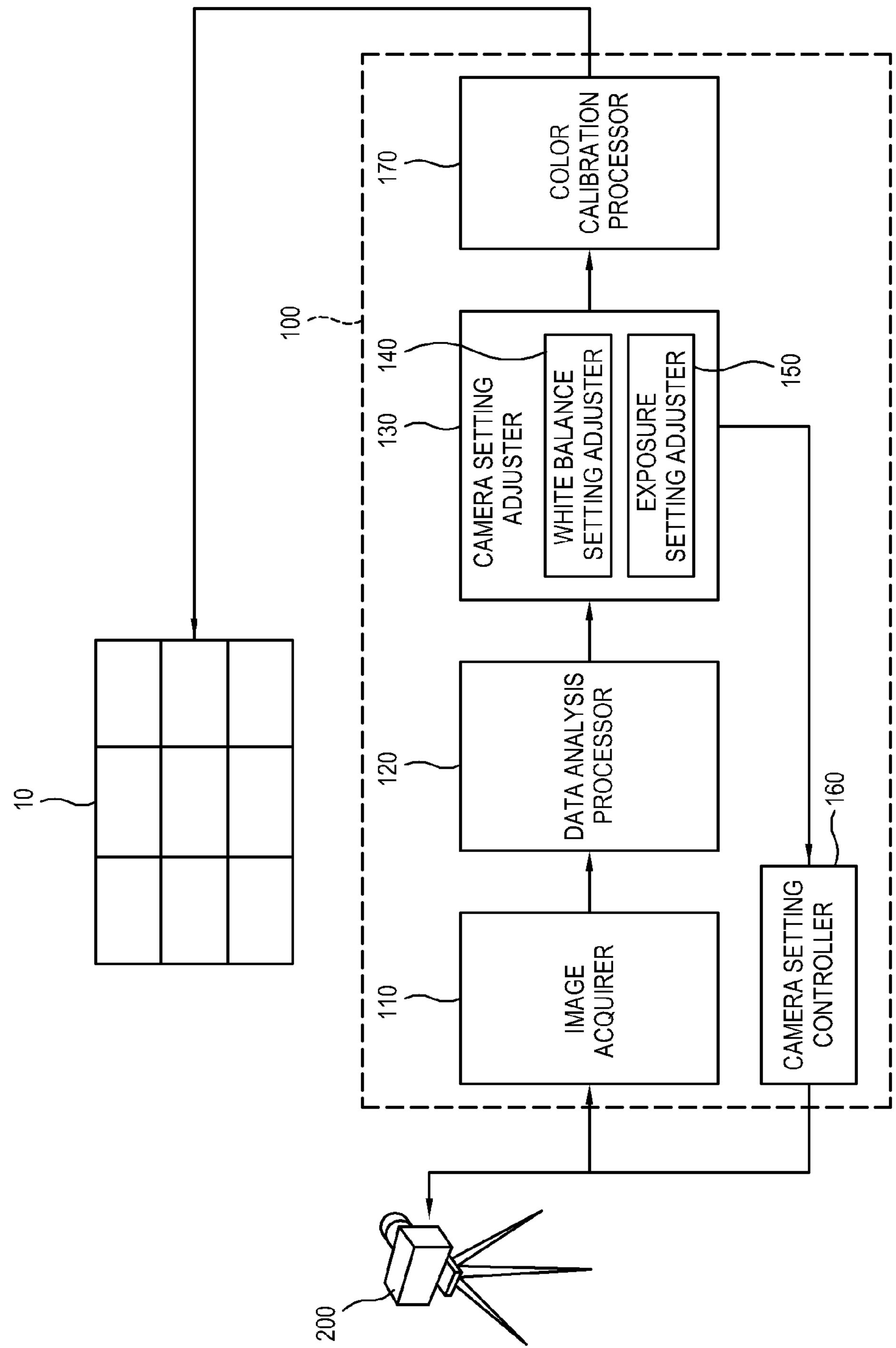
FIG. 2 is a block diagram showing an apparatus of controlling a color calibration camera of multi-displays according to an exemplary embodiment.

As shown in FIG. 2, according to an exemplary embodiment, the apparatus 100 of controlling the color calibration camera 200 for the multi-displays 10 includes an image acquirer 110 configured to acquire an image displayed on the multi-displays 10 using the camera 200; a data analysis processor 120 configured to analyze color data of an image displayed on an individual display through the acquired image; a camera setting adjuster 130, i.e. an image capture settings determiner, configured to determine camera settings suitable for the color calibration of all the multi-displays through results from analyzing the color data of the individual display; a camera setting controller 160, i.e. an image capture setting controller, configured to control the camera settings in accordance with the determined camera settings; and a color calibration processor 170 configured to perform color calibration of the multi-displays 10 based on the image photographed by the camera 200 controlled by the camera settings.

The image acquirer 110 photographs a pattern displayed on the multi-displays 10 including a plurality of individual displays using the camera 200, and transmits the photographed image to the data analysis processor 120. At this time, the pattern displayed for the color calibration on the multi-displays 10 includes a mono color image for gradation adjustment, such as a full white image, a full gray image, etc.

The data analysis processor 120 detects a plurality of display regions from the image acquired by photographing the image displayed on the multi-displays, and determines an effective data region in each display region, thereby outputting measured data. Here, the measured data may include respective relative ratios of red (R), green (G) and blue (B), and each data amount. The plurality of display regions may correspond to the individual displays of the multi-display, and may be sub-image corresponding to the individual displays.

The camera setting adjuster 130 may include a white balance setting adjuster 140 and an exposure setting adjuster 150. The camera setting adjuster 130 analyzes the measured data through the white balance setting adjuster 140 and the exposure setting adjuster 150 and determines the white balance settings and the exposure settings suitable for the color calibration. The camera setting adjuster 130 transmits information indicating the camera settings to be updated to the camera setting controller 160 if it is determined that the camera settings, such as the white balance settings and/or the exposure settings, should be changed. Then, the camera setting adjuster 130 determines whether additional camera settings are needed for the image acquired by the image acquirer 110 with the new camera settings. The operations for changing the camera settings, acquiring the image and outputting the measured data are repeated until the camera settings suitable for the color calibration are determined.

The camera setting controller 160 controls the white balance settings in accordance with setting information provided by the camera setting adjuster 130. The camera setting controller 160 may control shutter speed, aperture setting, and ISO speed, which are related to exposure, in accordance with the setting information provided by the camera setting adjuster 130.

Below, the camera setting adjuster 130 will be described with reference to FIGS. 3 to 6.

While a digital camera reproduces color of light sensed by an image sensor, image processing of the camera selects white as a reference for color to naturally maintain a color balance, which will be called a white balance. A method of adjusting the white balance includes automatically setting the white balance, or selecting a proper setting in accordance with the lighting of an environment in which a scene is to be photographed. Further, the user may directly input a white point as a reference to the camera.

In the case of the white balance settings, although the image is photographed under similar environments, image data may be tinged with blue if the white balance setting is low, and tinged with yellow or red if the white balance setting is high. This is because the data is adjusted by post-processing that offsets effects of external lighting during a white balance compensation process with regard to the data input to a camera sensor. Under a condition that the external lighting is matched with the camera settings, white is stored as white color data, and the image is processed without distorting the image data. However, if the external lighting and the camera settings are not matched, the image data may be distorted and tinged with color.

If white of the image acquired by the apparatus 100 for the color calibration among the displays using the camera 200 is represented by a color other than white, precision is different according to channels. For example, if white of the acquired image is tinged red, the R channel has high precision, but the G or B channels have relatively low precision. Such a difference in the precision causes the channels to be different in the number of adjustable steps for the color calibration and affects calibration performance. Therefore, the white balance setting adjuster 140 finds the settings of which the R, G, and B data acquired by the camera have similar levels so that the channels can have similar precision in measuring the data.

Figure 3:
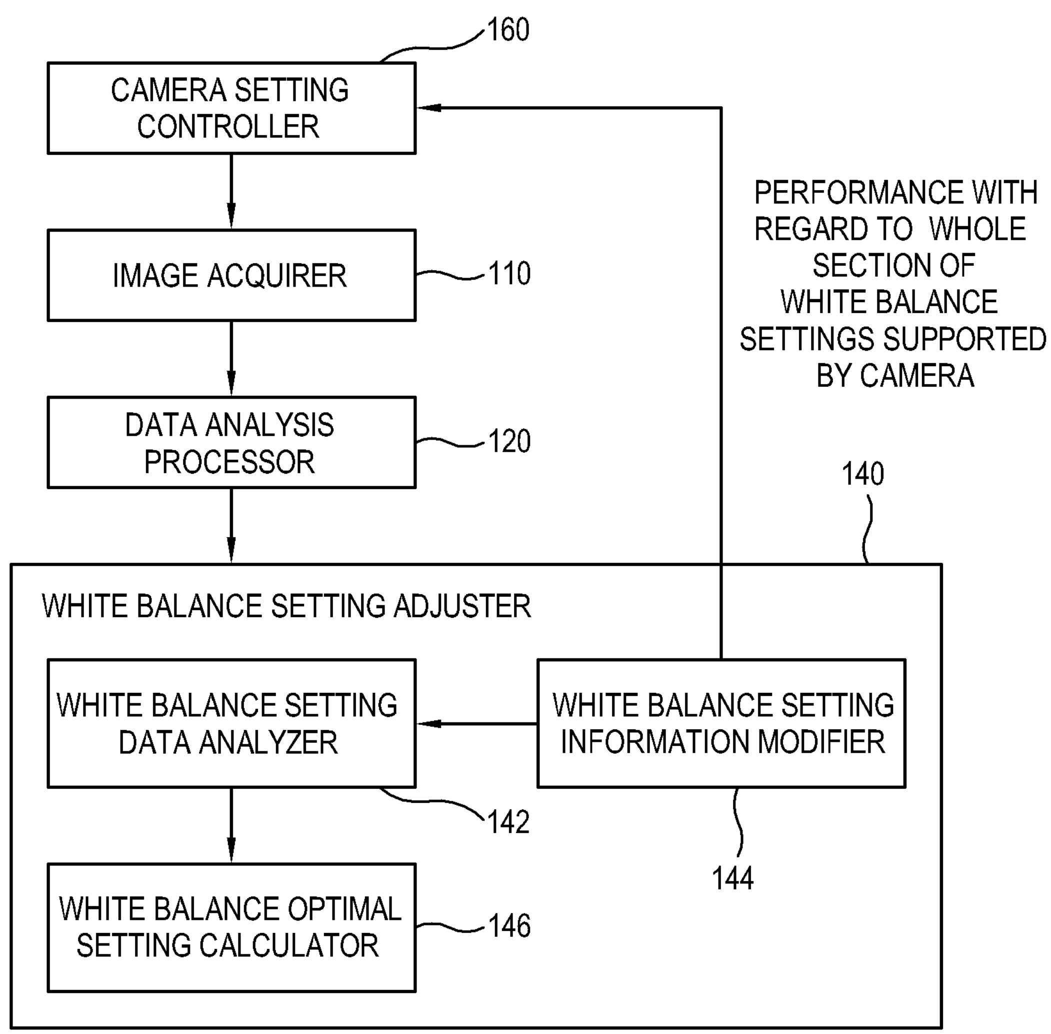
FIG. 3 is a block diagram showing a white balance setting adjuster in the color calibration camera of the multi-displays according to an exemplary embodiment.

FIG. 3 is a block diagram showing the white balance setting adjuster 140 according to an exemplary embodiment.

As shown in FIG. 3, the white balance setting adjuster 140 may include a white balance setting data analyzer 142, a white balance setting information modifier 144, and a white balance optimal setting calculator 146.

The white balance setting data analyzer 142 calculates the ratio and error of R, G, and B data of each display, with respect to the measured data received from the data analysis processor 120. Here, the error is an index for determining a similarity of the R, G, and B data. For example, the white balance setting data analyzer 142 calculates dissimilarities between the R, G, and B with reference to ratios of the measured data (R:G:B=1:1:1).

An expression for obtaining the ratio of the R, G, and B data with regard to each display is as follows:

$$\text{ratio\_}R=(R/(R+G+B))\times 3$$

$$\text{ratio\_}G=(G/(R+G+B))\times 3$$

$$\text{ratio\_}B=(B/(R+G+B))\times 3$$

An expression for calculating an error in the ratio of R:G:B with regard to each display is as follows, and a determination index used for calculating the optimal settings for a practical white balance is an average value of the errors in the respective displays:

$$\text{Error}=((\text{ratio\_}R-1)\times 2+(\text{ratio\_}G-1)\times 2+(\text{ratio\_}B-1)\times 2)/3$$

At this time, after the error of one white balance setting is calculated, the white balance setting information modifier 144 transmits the white balance settings to the camera setting controller 160. While changing the settings with regard to the whole section of the white balance settings supported by the camera 200, this operation is iteratively repeated until the errors in the ratio of R:G:B are calculated with regard to all the displays. The whole section of the white balance settings supported by the camera 200 may be set with a color temperature (i.e., Kelvin) corresponding to the photographing environments, for example, 1500-1900K (e.g., candlelight), 1600-2300K (e.g., an incandescent lamp), 2000-3000K (e.g., sunset, sunrise), about 3200K (e.g., a tungsten lamp), about 4000K (e.g., cool white fluorescent lamp or the like), about 5200K (outside under a clear sky), about 6000K (e.g., under a cloudy sky), and about 7000K (e.g., a shady place in a fine day).

After the error is calculated with regard to the whole section of the white balance settings, the white balance optimal setting calculator 146 calculates the white balance settings having the minimum error and outputs the white balance settings of minimal error as the optimal white balance settings.

In the case of the exposure settings for the camera 200, if the exposure is insufficient, the amount of acquired data is so small that the precision to be adjusted is low. On the other hand, if the exposure is excessive, the image is oversaturated and it is thus impossible to measure the color difference with great precision. Therefore, the exposure setting adjuster 150 finds the exposure settings for improving the precision within a range in which the measured data of each display is not saturated in the acquired image.

Figure 4:
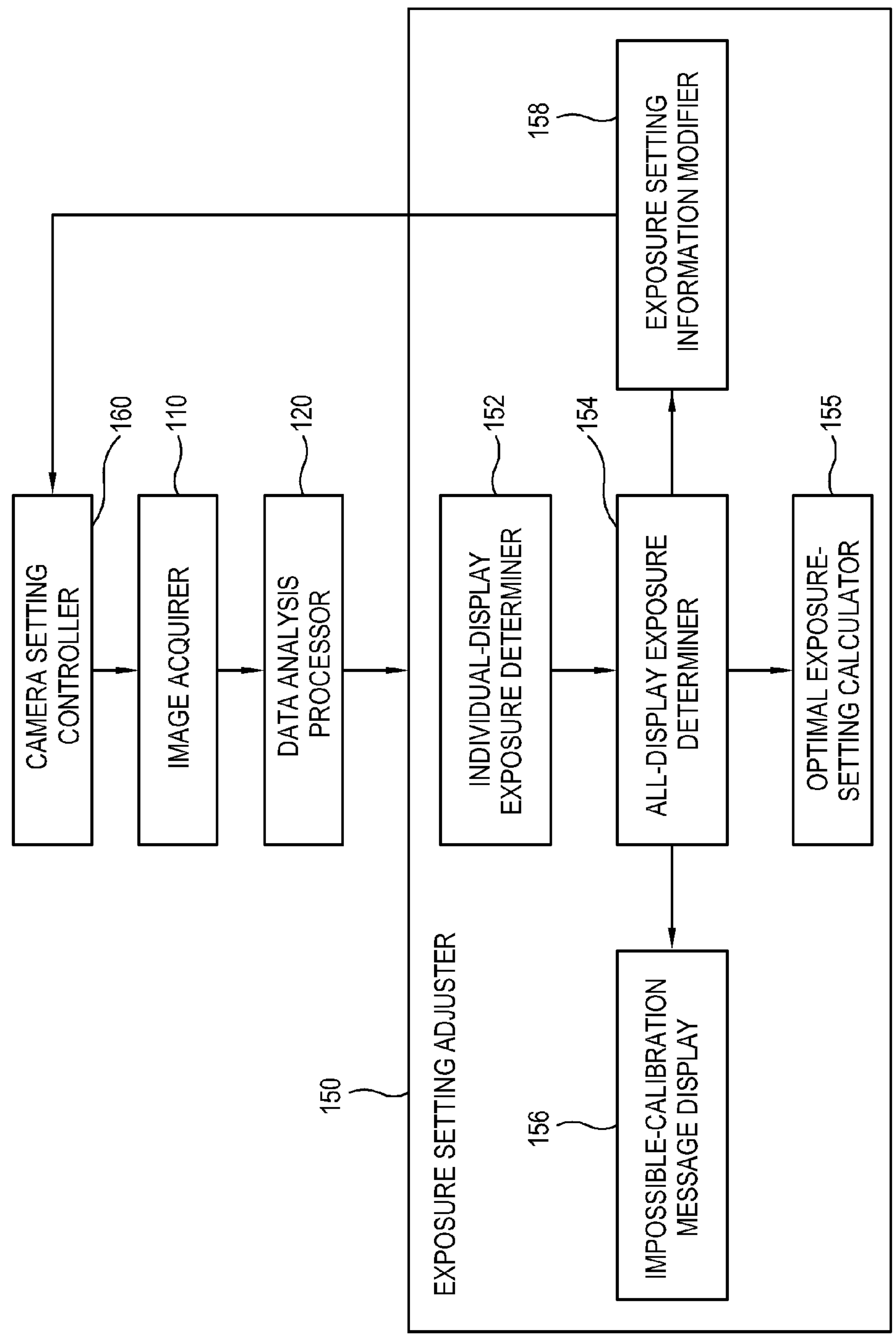
FIG. 4 is a block diagram showing an exposure setting adjuster in the color calibration camera of the multi-displays according to an exemplary embodiment.

FIG. 4 is a block diagram of the exposure setting adjuster 150 according to an exemplary embodiment. The exposure setting adjuster 150 includes an individual-display exposure determiner 152, an all-display exposure determiner 154, an optimal exposure-setting calculator 155, an impossible-calibration message display 156, and an exposure setting information modifier 158.

The individual-display exposure determiner 152 determines whether the R, G, and B measured data of the individual display received from the data analysis processor 120 is within a preset reference range and determines whether the exposure requires adjustment. If the measured data is within the reference range, the amount of data is not too small or too large that the data is not saturated and is within a proper range to undergo the color calibration.

The all-display exposure determiner 154 determines whether the exposure settings of the camera require adjustment, based on data analysis results of the individual display exposure determiner 152.

The impossible-calibration message display 156 outputs a message that the exposure is not adjustable, and stops the color calibration.

If adjusting the exposure is required based on the determination results from the all-display exposure determiner 154, the exposure setting information modifier 158 calculates the exposure settings for the adjustment and transmits the exposure settings to the camera setting controller 160, thereby reflecting the new exposure settings on to the camera.

On the other hand, if adjusting the exposure is not required based on the determination results from the all-display exposure determiner 154, the optimal exposure-setting calculator 155 selects the current exposure settings as the optimal settings.

Figure 5:
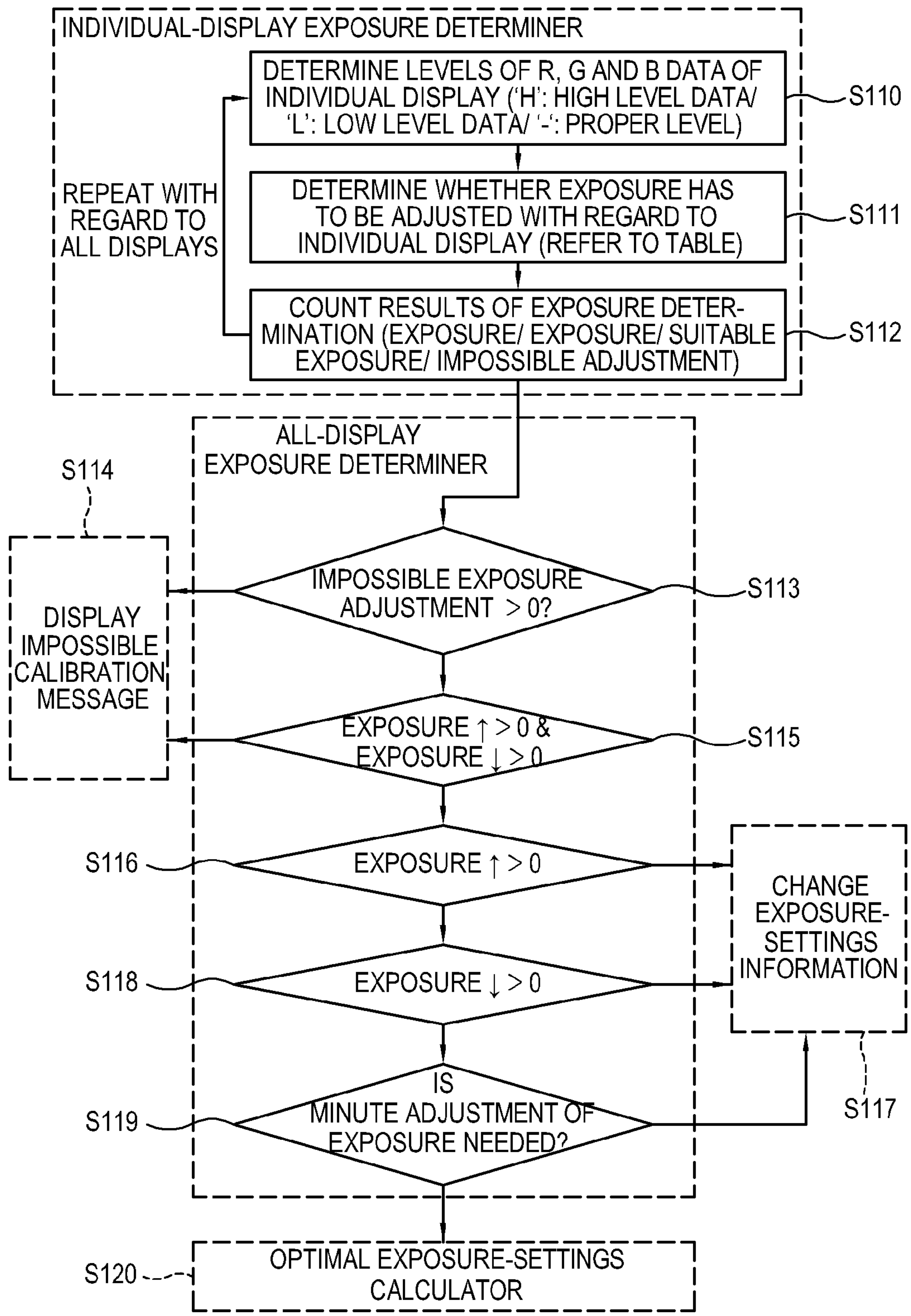
FIG. 5 is a flowchart showing processing operations of the exposure setting adjuster in FIG. 4 according to an exemplary embodiment.

Below, detailed operations of the individual display exposure determiner 152 and the all-display exposure determiner 154 will be described with reference to FIGS. 5 and 6.

At operation S110, the individual display determiner 152 determines levels of the R, G, and B measured data of the individual display. The data level for the determination is defined by setting an upper limit and a lower limit with respect to the amount of data, in which the data level is high 'H' if the data is more than the upper limit, the data level is low 'L' if the data is less than the lower limit, and the data level is acceptable '-' if the data level is within a proper range between the upper limit and the lower limit.

At operation S111, the individual display determiner 152 determines whether exposure adjustment is required with regard to each display, as shown in FIG. 6, based on combination of the respective data levels. That is, if all the R, G, and B data is acceptable, then adjusting the exposure is not required because the current settings are within the proper exposure range. If all the R, G, and B data levels are low or a combination of low and acceptable, the adjustment may increase the exposure. If all the R, G, and B data levels are high or a combination of high and acceptable, the adjustment may decrease the exposure. If one of the R, G, and B data levels is high and another of the data level is low, it may be determined that proper adjustment is impossible because decreasing the exposure would decrease the level of 'L,' and increasing the exposure would increase the level of 'H,' which means the data cannot enter a proper range through exposure adjustment.

At operation S112, the individual display determiner 152 counts the results of exposure determined in the operation S111. That is, the individual display determiner 152 counts the displays corresponding to exposure increase, exposure decrease, suitable exposure, and impossible exposure as the results of exposure determination.

At operation S113, the all-display exposure determiner 154 determines whether to adjust the exposure with regard to all the displays after the individual display determiner 152 determines whether to adjust the exposure of the individual display. At this time, the individual display determiner 152 determines whether there is a display of which the exposure adjustment is impossible among all the displays. If there is any display of which the exposure adjustment is impossible, it is determined that the exposure setting is impossible. Alternatively, if the number of displays of which the exposure adjustment is impossible is below a threshold, for example one, those displays may be ignored and the exposure setting may be performed with respect to the other displays for which adjustment is possible.

At operation S115, with regard to contradictory results, for example, if the exposures of some displays should be increased, but the exposures of the other some displays should be decreased, the all-display exposure determiner 154 may determine that the exposure setting is impossible.

At operation S114, the impossible-calibration message display 156 outputs the message that the exposure setting is impossible, as the determination of the all-display exposure determiner 154, and stops the color calibration.

At operation S116, the all-display exposure determiner 154 instructs the exposure setting information modifier 158 to increase the current exposure settings if there is a need of increasing the exposure. The increase may be an iterative increase.

At operation S118, the all-display exposure determiner 154 instructs the exposure setting information modifier 158 to decrease the current exposure settings if there is a need of decreasing the exposure. The decrease may be an iterative decrease.

At operation S117, the exposure setting information modifier 158 calculates a value for changing at least one of shutter speed, aperture and ISO speed, i.e., the camera settings related to the exposure if there is a need to adjust the exposure. The exposure setting information modifier 158 modifies the settings to decrease the shutter speed, decrease an aperture value, increase the ISO speed if the exposure should be increased, or some combination of the three. On the other hand, the exposure setting information modifier 158 modifies the settings to increase the shutter speed, increase an aperture value, decrease the ISO speed if the exposure should be decreased, or some combination of the three. The exposure setting information modifier 158 transmits the modified settings to the camera setting controller 160 so that new exposure settings can be reflected on the camera.

At operation S119, if there is no need of find adjustment of the exposure, the all-display exposure determiner 154 finally analyzes the data and determines whether fine adjustment is needed. If the minute adjustment is needed, the exposure setting information modifier 158 minutely adjusts the settings. On the other hand, if the minute adjustment is not needed, the exposure setting information modifier 158 determines the current exposure settings as the optimal settings.

At operation S120, the optimal exposure setting calculator 155 calculates and stores the current exposure settings as the optimal exposure settings if it is determined in operation S119 that minute exposure adjustment is not needed.

Then, the color calibration processor 170 sets the exposure of the camera in accordance with the stored optimal exposure settings, and thus performs the color calibration of the multi-displays 10 based on the image obtained by photographing the pattern image of the multi-displays 10.

As described above, the white balance and exposure degree are explained as the settings for optimizing the color calibration camera 200 for the multi-displays 10, but the settings are not limited thereto.

In the method of optimizing the white balance settings and the exposure settings of the camera, the operations of controlling the camera settings, acquiring the image, calculating the measured data, and optimizing the camera settings are automatically performed until the camera settings suitable for the color calibration are determined, so that the camera settings suitable for the color calibration may be set without requiring a user to analyze the data.

The above described aspects may be embodied on a non-transitory computer readable medium, having stored thereon a program for performing one or more of the above described methods. Non-transitory computer readable medium may include, as non-limiting examples, hard drives, floppy disks, optical disks, other device, read-only memory, or random-access memory.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A method of controlling a camera for color calibration of multi-displays, the method comprising:

acquiring a plurality of images displayed on the multi-displays by photographing the multi-displays with the camera while adjusting a setting condition of the camera;

analyzing the plurality of images of the multi-displays respectively, wherein the analyzing the plurality of images comprises:

detecting a plurality of display regions from the acquired plurality of images, determining an effective data region in each display region, determining color data of each individual display from the effective data region, and determining color data of the multi-displays using the color data of each individual display;

determining an optimum camera setting condition based on the color data of the multi-displays for every setting condition of the camera; and performing color calibration of the multi-displays based on the optimum camera setting condition.

2. The method according to claim 1, wherein the image displayed on the multi-displays comprises a color calibration pattern.

3. The method according to claim 2, wherein the color calibration pattern comprises a mono color image having full white gradation or full gray gradation.

4. The method according to claim 1, wherein the settings condition of the camera comprise white balance settings, and the determining the color data of each individual display comprises calculating a white balance error with respect to red (R):green(G):blue(B)=1:1:1 in the effective data region displayed in the at least one individual display, based on the result of the analyzing.

5. The method according to claim 4, wherein the determining the color data of the multi-displays comprises calculating an average error of the multi-displays, based on the white balance error of the at least one individual display.

6. The method according to claim 5, wherein the determining the optimum camera setting condition comprises calculating an average error of the multi-displays with respect to the white balance of the camera, and selecting the white balance settings minimizing the average error.

7. The method according to claim 6, wherein the adjusting comprises adjusting the setting condition of the camera according to the selected white balance settings having the minimum average error.

8. The method according to claim 1, wherein the setting condition of the camera comprise exposure settings, and the determining the color data of each individual display comprises:

measuring each level of R, G, and B data of the at least one individual display, determining whether the measured levels of R, G, and B data are within a predetermined reference range, and determining whether to adjust the exposure based on a result of the determining.

9. The method according to claim 8, further comprising generating, in response to the result of the determining indicating that there is an individual display of which the levels of R, G, and B data are higher than the predetermined reference range and lower than the predetermined reference range, a message that exposure adjustment is impossible.

10. An apparatus for controlling a camera for color calibration of multi-displays, the apparatus comprising:

an image acquirer which acquires a plurality of images displayed on the multi-displays with the camera while adjusting a setting condition of the camera;

a data analysis processor which analyzes the plurality of images of the multi-displays respectively, wherein the data analysis processor analyzes the plurality of images by:

detecting a plurality of display regions from the acquired plurality of images, determining an effective data region in each display region, determining color data of each individual display from the effective data region, and determining color data of the multi-displays using the color data of each individual display;

an image capture setting determiner which determines an optimum camera setting condition based on the color data of the multi-displays for every setting condition of the camera; and a color calibration processor which performs color calibration of the multi-displays based on the optimum camera setting condition.

11. The apparatus according to claim 10, wherein the image displayed on the multi-displays comprises a color calibration pattern.

12. The apparatus according to claim 11, wherein the color calibration pattern comprises a mono color image having full white gradation or full gray gradation.

13. The apparatus according to claim 10, further comprising a white balance setting adjuster which calculates a white balance error with respect to red (R):green(G):blue(B)=1:1:1 in the effective data region displayed on the at least one individual display, based on the result of the analyzing.

14. The apparatus according to claim 13, wherein the white balance setting adjuster calculates an average error of the multi-displays, based on the white balance error of the at least one individual display.

15. The apparatus according to claim 14, wherein the white balance setting adjuster further calculates an average error of the multi-displays with respect to the white balance of the camera, and selects the white balance settings minimizing the average error.

16. The apparatus according to claim 15, further comprising a camera setting controller which controls the camera to have the selected white balance settings having the minimum average error.

17. The apparatus according to claim 10, further comprising an exposure setting adjuster, which measures each level of R, G, and B data of the at least one individual display, to determine whether the measured levels of R, G, and B data are within a predetermined reference range, and determines whether to adjust the exposure based on a result of the determining.

18. The apparatus according to claim 17, wherein the exposure setting adjuster generates, in response to the result of the determining indicating that there is an individual display of which the levels of R, G, and B data are higher than the predetermined reference range and lower than the predetermined reference range, a message that exposure adjustment is impossible.

* * * * *